US008840199B2

(12) United States Patent
Hatano et al.

(10) Patent No.: US 8,840,199 B2
(45) Date of Patent: Sep. 23, 2014

(54) SLAVE CYLINDER

(75) Inventors: Kunimichi Hatano, Saitama (JP);
Takaaki Ohnishi, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/877,409

(22) PCT Filed: Oct. 3, 2011

(86) PCT No.: PCT/JP2011/072801
§ 371 (c)(1),
(2), (4) Date: Apr. 2, 2013

(87) PCT Pub. No.: WO2012/046703
PCT Pub. Date: Apr. 12, 2012

(65) Prior Publication Data
US 2013/0186083 A1 Jul. 25, 2013

(30) Foreign Application Priority Data

Oct. 4, 2010 (JP) .................................. 2010-224479

(51) Int. Cl.
*B60T 8/42* (2006.01)
*B60T 13/74* (2006.01)
*B60T 13/68* (2006.01)
*B60T 13/66* (2006.01)
*B60T 8/40* (2006.01)

(52) U.S. Cl.
CPC ............. *B60T 13/686* (2013.01); *B60T 13/745* (2013.01); *B60T 13/662* (2013.01); *B60T 8/4081* (2013.01)
USPC .................................... 303/115.2; 303/113.1

(58) Field of Classification Search
CPC ....... B60T 8/40; B60T 8/4077; B60T 8/4081; B60T 8/48; B60T 13/10; B60T 13/12; B60T 13/66; B60T 13/74; B60T 13/745
USPC ............... 303/20, 113.1, 113.2, 113.3, 113.4, 303/115.1, 115.2, 116.1, 116.2; 60/571
See application file for complete search history.

(56) References Cited

U.S. PATENT DOCUMENTS 2,174,615 A * 10/1939 Bowen et al. ................... 60/562
5,031,968 A    7/1991 Takata (Continued)

FOREIGN PATENT DOCUMENTS

| JP | H02-299962 A | 12/1990 |
| JP | 2008-143419 A | 6/2008 |
| JP | 2010-047216 A | 3/2010 |

*Primary Examiner* — Thomas J Williams
(74) *Attorney, Agent, or Firm* — Carrier Blackman & Associates, P.C.; Joseph P. Carrier; Jeffrey T. Gedeon (57) ABSTRACT

A slave cylinder includes a first input port provided to a first slave hydraulic chamber and which is connected to a master cylinder and is selectively cut off from the master cylinder by a first shut-off valve; a second input port provided to a second slave hydraulic chamber and which is connected to the master cylinder and is selectively cut off from the master cylinder by a second shut-off valve; a first atmosphere port formed in a first back chamber disposed in rear of the first slave hydraulic chamber and which moves together with a first piston; a second atmosphere port formed in a second back chamber disposed in front of the first slave hydraulic chamber and which moves together with a second piston; and a restricting means to restrict the second piston. The second atmosphere port is disposed in the vicinity of the restricting means.

9 Claims, 2 Drawing Sheets

(56) References Cited

U.S. PATENT DOCUMENTS

| | | |
|---|---|---|
| 7,651,176 B2 | 1/2010 | Inoue et al. |
| 8,333,442 B2 * | 12/2012 | Hatano et al. .............. 303/115.1 |
| 2008/0079309 A1 * | 4/2008 | Hatano et al. .............. 303/113.5 |
| 2008/0290726 A1 | 11/2008 | Inoue et al. |
| 2009/0179483 A1 * | 7/2009 | Hatano .............................. 303/3 |
| 2012/0000738 A1 * | 1/2012 | Inoue et al. ................. 188/106 P |
| 2012/0119566 A1 * | 5/2012 | Ohnishi et al. .................. 303/20 |
| 2012/0161506 A1 * | 6/2012 | Tanaka et al. ................... 303/14 |
| 2012/0193975 A1 * | 8/2012 | Ishii ................................ 303/14 |
| 2012/0228924 A1 * | 9/2012 | Hatano et al. ................ 303/6.01 |
| 2012/0283926 A1 * | 11/2012 | Ito .................................... 701/70 |
| 2012/0306260 A1 * | 12/2012 | Ohkubo et al. .................. 303/14 |
| 2012/0326491 A1 * | 12/2012 | Gotoh et al. ................. 303/6.01 |
| 2013/0134768 A1 * | 5/2013 | Ito et al. ............................. 303/3 |
| 2013/0220744 A1 * | 8/2013 | Ohnishi et al. ................. 188/152 |
| 2013/0232965 A1 * | 9/2013 | Ohnishi et al. .................. 60/545 |
| 2013/0232966 A1 * | 9/2013 | Murayama et al. ............. 60/545 |
| 2013/0232968 A1 * | 9/2013 | Ohnishi et al. .................. 60/545 |
| 2013/0239567 A1 * | 9/2013 | Ohnishi et al. .................. 60/545 |
| 2013/0291533 A1 * | 11/2013 | Inoue et al. ..................... 60/545 |

* cited by examiner

SLAVE CYLINDER

TECHNICAL FIELD

The present invention relates to a slave cylinder used as an electrically hydraulic source in an electric brake system including a shut-off valve and the electrically hydraulic source between a master cylinder and wheel cylinders.

BACKGROUND ART

In an electric brake system, a master cylinder is connected via a hydraulic passage to a wheel cylinder. When a driver operates a brake operation part, an upstream hydraulic pressure is produced in this master cylinder. This upstream hydraulic pressure is shut off by a shut-off valve, so that the wheel cylinder is not directly actuated. At that time, not only an operated variable set by the brake operation part but also an additional physical variable are added to produce a downstream hydraulic pressure in a slave cylinder (hydraulic source). Accordingly, the wheel cylinder is actuated. Such a brake system is called a Brake-by-Wire (BBW) system. Then, a conventional electric brake system which implements this brake system has been disclosed (see, for example, Patent Document 1).

PRIOR ART DOCUMENT

Patent Document

Patent Document 1: JP2010-47216A

SUMMARY OF INVENTION

Problem to be Solved by Invention

A conventional electric brake system has a simple structure and can perform regenerative coordination control. When a downstream hydraulic pressure in a slave cylinder (hydraulic source) cannot be produced due to a power failure, a shut-off valve is opened. Then, a brake fluid controlled via a brake operation part by a driver flows into an input port of the slave cylinder. Accordingly, an upstream hydraulic pressure produced in a master cylinder is transferred to a wheel cylinder.

In the conventional electric brake system, the shut-off valve is closed at all times when the system operates normally (i.e., the system is not experiencing a power failure, etc.). Because of this, a pressure difference between the upstream hydraulic pressure and the downstream hydraulic pressure is imposed on the shut-off valve. A larger pressure difference makes it difficult to shut off a brake fluid flow by using the shut-off valve. Thus, in order to reduce a pressure difference applied to the shut-off valve, the pressure difference is made to be dispersed and imposed on the slave cylinder.

In view of the above, the conventional slave cylinder has not only a function as an electrically hydraulic source but also a function of cutting off a brake fluid flow. In the conventional slave cylinder, when a piston is electrically in motion so as to produce a downstream hydraulic pressure, this piston movement closes an input port of its cylinder. Accordingly, this closure cuts off the brake fluid flow. Given such a cut-off function, the piston of the slave cylinder should be moved to open the input port by using the upstream hydraulic pressure produced in the master cylinder in the case of a power failure, etc. Consequently, a back chamber operating together with the piston includes an auxiliary port connected to the input port.

In view of the above, in the conventional slave cylinder, the piston movement promotes and cuts off the brake fluid flow (i.e., opens and closes the input port). As a result, it is difficult to reduce an amount of the brake fluid flowing during a state transition between a flowing state and a shut-off state. Thus, a response during the state transition is hardly improved. Specifically, it is difficult to improve a response of a downstream hydraulic pressure produced in accordance with a piston movement of a slave cylinder and a master cylinder.

Here, it is an object of the present invention to provide a slave cylinder capable of improving the response of a downstream hydraulic pressure produced in accordance with a piston movement of a slave cylinder and a master cylinder.

Means for Solving Problem

An aspect of the present invention provides a slave cylinder includes a cylinder housing a first piston moved forward by a motor; and a second piston disposed in front of the first piston, wherein the first piston and the second piston have a first slave hydraulic chamber formed therebetween, and the first slave hydraulic chamber has a first input port which is connected to a master cylinder and is capable of being cut off from the master cylinder by a shut-off valve, wherein the second piston and an end of the cylinder have a second slave hydraulic chamber formed therebetween, and the second slave hydraulic chamber has a second input port which is connected to the master cylinder and is capable of being cut off from the master cylinder by a shut-off valve. The slave cylinder includes a first atmosphere port formed to a first back chamber which is disposed in rear of the first slave hydraulic chamber and which moves together with the first piston; a second atmosphere port formed to a second back chamber which is disposed in front of the first slave hydraulic chamber and in rear of the second slave hydraulic chamber and which moves together with the second piston; and a restricting means to restrict the second piston to be moved backward, wherein the second atmosphere port is disposed in the vicinity of the restricting means in an axial direction of the cylinder.

An electric brake system using a slave cylinder according to an embodiment of the present invention includes a shut-off valve which is capable of cutting off a brake fluid flow independent of a pressure difference between an upstream hydraulic pressure and a downstream hydraulic pressure at a normal condition when a power failure, etc., does not occur. Because of the above situation, the shut-off valve has increased power consumption and is made larger. This configuration makes it possible for the slave cylinder not to have a function of cutting off a brake fluid flow. According to the slave cylinder, movements of the first and the second pistons neither causes the brake fluid to flow nor the brake fluid flow to be cut off. Thus, it is possible to improve a response of the downstream hydraulic pressure produced in accordance with the movements of the first and the second pistons of the slave cylinder and the pistons of the master cylinder.

Specifically, the cut-off function is unnecessary, and the first and the second input ports do not need to be opened by moving the first and the second pistons of the slave cylinder by using the upstream hydraulic pressure produced in the master cylinder in the case of a power failure, etc. As a result, an auxiliary port connected to the first and the second input ports is not required to be formed in a third back chamber which moves together with the first and the second pistons.

The first piston has the first back chamber having the first atmosphere port and moving together with the first piston. Consequently, there is no need to form a third back chamber having an auxiliary port. Because of this configuration, the axial length of the cylinder for the first piston is shortened, and the weight of the first piston is made light. Accordingly, the movement of the first piston is facilitated, thereby improving a response of the downstream hydraulic pressure produced in accordance with the movement of the first piston. In addition, a constant pressure such as an atmospheric pressure is applied via the first atmosphere port to the first back chamber. Accordingly, the first piston to move together with the first back chamber is usually reset to a predetermined position depending on the constant pressure. This configuration reduces a variation in the response of the downstream hydraulic pressure produced in accordance with the movement of the first piston.

The second piston has the second back chamber having the second atmosphere port and moving together with the second piston. Consequently, there is no need to form a third back chamber having an auxiliary port. This configuration allows the axial length of the cylinder for the second piston to be shortened, and the weight of the second piston to be made light. Accordingly, the movement of the second piston is facilitated, thereby improving a response of the downstream hydraulic pressure produced in accordance with the movement of the second piston. In addition, a constant pressure such as an atmospheric pressure is applied via the second atmosphere port to the second back chamber. Accordingly, the second piston moves together with the second back chamber is usually reset to a predetermined position depending on the constant pressure. This configuration reduces a variation in the response of the downstream hydraulic pressure produced in accordance with the movement of the second piston.

In addition, the first piston is made to move forward by a motor, and the second piston disposed in front of the first piston moves forward in accordance with the forward movement of the first piston. Meanwhile, the backward movement of the second piston cannot be restricted by the motor. Thus, the slave cylinder has restricting means for restricting a movement of the second piston. Then, the slave cylinder has the second atmosphere port positioned in the vicinity of the restricting means in the axial direction of the cylinder. This allows the restricting means to be arranged in the vicinity of the second back chamber. Accordingly, the arrangement of the restricting means makes the axial length of the cylinder for the second piston be kept short without becoming longer.

As described above, the lengths of the first and the second pistons become short, so that the length of the cylinder housing these pistons is shortened. Eventually, the whole length of the slave cylinder is shortened. As the whole length of the slave cylinder become short, installability of the cylinder onto the electric brake system as well as a vehicle is improved. In addition, since the length of the cylinder is shortened, the cylinder has a short internal depth in the axial direction. Thus, this configuration makes it easier to produce the cylinder, thereby increasing its productivity.

In addition, in the present invention, it is preferable that the restricting means includes: a hole formed in the second piston; and a pin which protrudes from an opening of the cylinder in a direction toward the second piston and is engaged in the hole.

According to this configuration, the second piston having the hole can move within only an extent to which the pin protruding from the cylinder is engaged in the hole. The restricting means can thus restricting the movement of the second piston. Then, because the restricting means is disposed in the vicinity of the second atmosphere port, so that the pin of the restricting means is also disposed in the vicinity of the second atmosphere port. For allowing the pin to protrude from the cylinder, a hole is defined in the cylinder, and the pin is made to fit into the hole. Since the hole for fitting the pin thereinto may be formed in the vicinity of the hole used for the second atmosphere port in the same direction, the hole is easily formed. In addition, the pin is allowed to protrude while examining the condition, such as a position of the hole at the second piston, through the hole used for the second atmosphere port. Consequently, this can make it easy for the pin to project from the cylinder with the pin engaged in the hole of the second piston.

In addition, in the present invention, it is preferable that the slave cylinder includes a first output port which is formed in the first slave hydraulic chamber and is connected to a first brake cylinder; and the first output port is disposed in the vicinity of the first input port in the axial direction of the cylinder.

In this configuration, the first output port is positioned in the vicinity of the first input port. Accordingly, in the case of a power failure, etc., an upstream hydraulic pressure transferred from the first input port can be transferred as a downstream hydraulic pressure to the first output port without causing a transfer loss. Then, a response of a hydraulic pressure transition from the upstream hydraulic pressure to the downstream hydraulic pressure is improved. In addition, since the first output port is positioned in the vicinity of the first input port, the length of the cylinder in the axial direction is shortened. Consequently, the cylinder is easily processed, thereby increasing its productivity.

In addition, in the present invention, it is preferable that the slave cylinder includes a second output port which is formed in the second slave hydraulic chamber and is connected to a second brake cylinder; and the second output port is disposed in the vicinity of the second input port in the axial direction of the cylinder.

In this configuration, the second output port is positioned in the vicinity of the second input port. Accordingly, in the case of a power failure, etc., an upstream hydraulic pressure transferred from the second input port is transferred as a downstream hydraulic pressure to the second output port without causing a transfer loss. Then, a response of a hydraulic pressure transition from the upstream hydraulic pressure to the downstream hydraulic pressure is improved. In addition, since the second output port is positioned in the vicinity of the second input port, the length of the cylinder in the axial direction is shortened. Consequently, the cylinder is easily processed, thereby increasing its productivity.

ADVANTAGEOUS EFFECTS OF INVENTION

Embodiments of the present invention provide a slave cylinder capable of improving a response of a downstream hydraulic pressure produced in accordance with piston movements of a slave cylinder and a master cylinder.

EMBODIMENTS FOR CARRYING OUT INVENTION

The following specifically describes an embodiment of the present invention by appropriately referring to the drawings.

Note that parts shared among the respective figures have the same reference signs so as to avoid redundant description.

Figure 1:
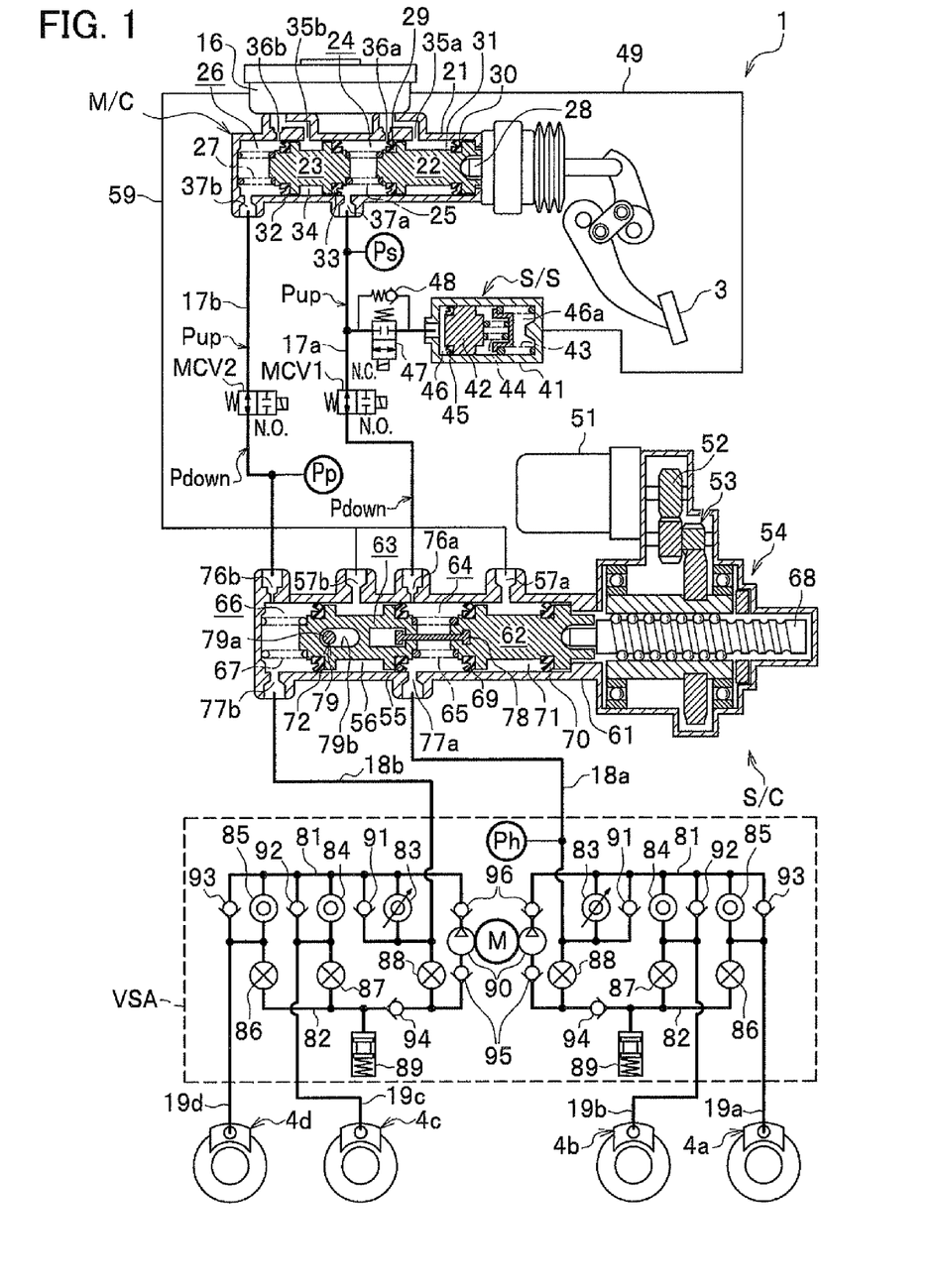
FIG. 1 illustrates a configuration of an electric brake system having a slave cylinder installed therewith according to an embodiment of the present invention.

FIG. 1 illustrates a configuration of an electric brake system 1 having a slave cylinder S/C installed therewith according to an embodiment of the present invention. The electric brake system 1 includes: a brake pedal 3; wheel cylinders 4a, 4b, 4c, and 4d; a tandem master cylinder M/C which can produce a hydraulic pressure by driver's operation of the brake pedal 3; hydraulic passages 17a-18a-19a and 17a-18a-19b of a first hydraulic system connecting between a first hydraulic chamber 24 of the master cylinder M/C and the wheel cylinders 4a and 4b; and hydraulic passages 17b-18b-19c and 17b-18b-19d of a second hydraulic system connecting between a second hydraulic chamber 26 of the master cylinder M/C and the wheel cylinders 4c and 4d.

The master cylinder M/C includes a first piston 22 and a second piston 23 which slidably fit into a cylinder 21. A first return spring 25 is disposed at the first hydraulic chamber 24 whose compartment is disposed in front of the first piston 22. A second return spring 27 is disposed at the second hydraulic chamber 26 whose compartment is disposed in front of the second piston 23. The rear end of the first piston 22 is connected via a push rod 28 to the brake pedal 3. When a driver presses the brake pedal 3, the first piston 22 and the second piston 23 move forward to produce an upstream hydraulic pressure Pup in the first hydraulic chamber 24 and the second hydraulic chamber 26.

A first back chamber 31 is formed between cup seals 29 and 30 of the first piston 22. A second back chamber 34 is formed between cup seals 32 and 33 of the second piston 23. The cylinder 21 includes: from the rear to the front, a supply port 35a communicating with the first back chamber 31; a relief port 36a open into the first hydraulic chamber 24 immediately in front of the cup seal 29; an output port 37a opened into the first hydraulic chamber 24; a supply port 35b communicating with the second back chamber 34; a relief port 36b open into the second hydraulic chamber 26 immediately in front of the cup seal 32; and an output port 37b open into the second hydraulic chamber 26. The supply port 35a and the relief port 36a are joined and communicate with a reservoir 16. The supply port 35b and the relief port 36b are joined and communicate with the reservoir 16. The hydraulic passage (the first hydraulic system) 17a is connected to the output port 37a. The hydraulic passage (the second hydraulic system) 17b is connected to the output port 37b. When a driver presses the brake pedal 3, the first piston 22 and the second piston 23 move forward and mechanically close the relief ports 36a and 36b. Accordingly, an upstream hydraulic pressure Pup is produced in the first hydraulic chamber 24 and the second hydraulic chamber 26, responding to an operated variable input from the brake pedal 3.

In addition, the electric brake system 1 has a slave cylinder (hydraulic source) S/C. The slave cylinder S/C is disposed on the hydraulic passage 17a-18a of the first hydraulic system and the hydraulic passage 17b-18b of the second hydraulic system. The slave cylinder S/C makes it possible to produce downstream hydraulic pressures Pdown in a hydraulic passage 18a of the first hydraulic system and a hydraulic passage 18b of the second hydraulic system, based on the operated variable input from the brake pedal 3.

The electric brake system 1 sets a command variable for the downstream hydraulic pressure Pdown, based on the operated variable input from the brake pedal 3. Based on the command variable, the downstream hydraulic pressure Pdown is controlled. First, an operated variable input from the brake pedal 3 is detected. Next, based on the operated variable, an upstream hydraulic pressure Pup is estimated. Then, based on the estimated upstream hydraulic pressure Pup, a command variable for a downstream hydraulic pressure Pdown is adjusted. This adjustment is carried out based on regenerative braking force controlled by a regenerative brake system and based on a distribution ratio of hydraulic braking force among wheel cylinders 4a, 4b, 4c, and 4d. Based on a relationship between the command variable for the downstream hydraulic pressure Pdown and an operation amount of a first piston 62 and a second piston 63 of the slave cylinder (hydraulic source) S/C, the electric brake system 1 determines the operation amount by using the command variable. After that, based on the determined operation amount, the downstream hydraulic pressure Pdown is produced in the slave cylinder (hydraulic source) S/C.

The slave cylinder (hydraulic source) S/C includes a first piston (slave piston) 62 and a second piston (slave piston) 63 which slidably fit into a cylinder 61. A first return spring 65 is disposed at the first hydraulic chamber 64 whose compartment is disposed in front of the first piston 62. A second return spring 67 is disposed at the second hydraulic chamber 66 whose compartment is disposed in front of the second piston 63. A first hydraulic chamber (first slave hydraulic chamber) 64 is formed between the first piston 62 and the second piston 63. A second hydraulic chamber (second slave hydraulic chamber) 66 is formed between the second piston 63 and the front end of the cylinder 61. A motor 51 is connected to the rear end of the first piston 62 via a push rod 68, a ball screw mechanism 54, a deceleration mechanism 53, and a gear 52. These components constitute motor cylinders (52, 53, 54, and 68). In the slave cylinder (hydraulic source) S/C, when the motor 51 rotates, the push rod 68 as well as the first piston 62 and the second piston 63 (i.e., slave pistons) move forward. As a result, a downstream hydraulic pressure Pdown is produced in the first hydraulic chamber 64 and the second hydraulic chamber 66. The motor 51 moves the first piston 62 forward. The second piston 63 is provided in front of the first piston 62. The cylinder 61 houses the first piston 62 and the second piston 63.

A first back chamber 71 is formed between cup seals 69 and 70 of the first piston 62. A second back chamber 56 is formed between cup seals 72 and 55 of the second piston 63. The first back chamber 71 is produced as a recessed portion at a sliding surface of the first piston 62. The first back chamber 71 is partitioned by a front sliding part (a cup seal 69), and is disposed in rear of the first hydraulic chamber 64. Accordingly, the first back chamber 71 moves together with the first piston 62. The second back chamber 56 is produced as a recessed portion at a sliding surface of the second piston 63. The second back chamber 56 is partitioned by a front sliding part (a cup seal 72), and is disposed in rear of the second hydraulic chamber 66. Accordingly, the second back chamber 56 moves together with the second piston 63.

The first piston 62 should have an enough length in an axial direction to produce the first back chamber 71. Thus, the length can be shortened and the weight of the first piston 62 can be made light. Accordingly, the movement of the first piston 62 can be facilitated, thereby improving a response of a downstream hydraulic pressure Pdown produced in accordance with the movement of the first piston 62. Likewise, the second piston 63 should have an enough length in an axial direction to form the second back chamber 56. Thus, the length is shortened and the weight of the second piston 63 is made light. Accordingly, the movement of the second piston 63 can be facilitated, thereby improving a response of a downstream hydraulic pressure Pdown produced in accordance with the movement of the second piston 63. The lengths of the first piston 62 and the second piston 63 are short, so that the length of the cylinder 61 housing these pistons is shortened. Eventually, the entire length of the slave cylinder S/C is shortened. As the entire length of the slave cylinder S/C become short, installability of the cylinder onto the electric brake system 1 as well as a vehicle can be improved. In addition, since the length of the cylinder 61 is shortened, the cylinder 61 has a short internal depth in the axial direction. Thus, this configuration makes it easier to produce the cylinder, thereby increasing its productivity.

The cylinder 61 includes: from the rear to the front, a first atmosphere port 57a communicating with the first back chamber 71; a first input port 76a open into the first hydraulic chamber 64 in front of the cup seal 69; a first output port 77a open into the first hydraulic chamber 64; a second atmosphere port 57b communicating with the second back chamber 56; a second atmosphere port 76b open into the second hydraulic chamber 66 in front of the cup seal 72; and a second output port 77b open into the second hydraulic chamber 66. The first input port 76a is connected to and communicates with the hydraulic passage (the first hydraulic system) 17a. The second input port 76b is connected to and communicates with the hydraulic passage (the second hydraulic system) 17b. The first input port 76a is connected to the first hydraulic chamber 24 of the master cylinder M/C. A master cut-off valve MCV 1 can cut off the connection. The second input port 76b is connected to the second hydraulic chamber 26 of the master cylinder M/C. A master cut-off valve MCV2 can cut off the connection. The first atmosphere port 57a and the second atmosphere port 57b are connected via a fluid passage 59 to the reservoir 16. The hydraulic passage (the first hydraulic system) 18a is connected to the first output port 77a. The hydraulic passage (the second hydraulic system) 18b is connected to the second output port 77b.

A constant pressure such as an atmospheric pressure can be applied via the first atmosphere port 57a to the first back chamber 71. Accordingly, a sliding part of the first piston 62, which moves together with the first back chamber 71, can be pushed at the constant pressure, such as an atmospheric pressure, from the side of the first back chamber 71 to the side of the first hydraulic chamber 64. Consequently, the first piston 62 can usually be reset to a predetermined position in the cylinder 61 depending on the constant pressure. This configuration can help reduce a variation in a response of a downstream hydraulic pressure Pdown produced in accordance with the movement of the first piston 62. Likewise, a constant pressure such as an atmospheric pressure can be applied via the second atmosphere port 57b to the second back chamber 56. Accordingly, a sliding part of the second piston 63, which moves together with the second back chamber 56, can be pushed at the constant pressure, such as an atmospheric pressure, from the side of the second back chamber 56 to the side of the second hydraulic chamber 66. Consequently, the second piston 63 can usually be reset to a predetermined position in the cylinder 61 depending on the constant pressure. This configuration can help reduce a variation in a response of a downstream hydraulic pressure Pdown produced in accordance with the movement of the second piston 63.

In addition, as illustrated in FIG. 1, the first output port 77a is arranged in the vicinity of the first input port 76a with regard to the axial direction of the cylinder 61. This configuration makes it possible to transfer an upstream hydraulic pressure Pup transferred from the first input port 76a to the first output port 77a as a downstream hydraulic pressure Pdown without causing a transfer loss at an abnormal case such as a power failure. Thus, a response of a hydraulic pressure transition from the upstream hydraulic pressure to the downstream hydraulic pressure can be improved. In addition, since the first output port 77a is positioned in the vicinity of the first input port 76a, the length of the cylinder 61 in the axial direction can be shortened. Consequently, the cylinder 61 is easily processed, thereby increasing its productivity.

Likewise, the second output port 77b is arranged in the vicinity of the second input port 76b with regard to the axial direction of the cylinder 61. This configuration makes it possible to transfer an upstream hydraulic pressure Pup transferred from the second input port 76b to the second output port 77b as a downstream hydraulic pressure Pdown without causing a transfer loss at an abnormal case such as a power failure. Thus, a response of a hydraulic pressure transition from the upstream hydraulic pressure to the downstream hydraulic pressure can be improved. In addition, since the second output port 77b is positioned in the vicinity of the second input port 76b, the length of the cylinder 61 in the axial direction can be shortened. Consequently, the cylinder 61 can be easily processed, thereby increasing its productivity.

Also, the electric brake system 1 has master cut-off valves (shut-off valves: normally open (N.O.)) MCV1 and MCV2. The master cut-off valve MCV1 is positioned on the hydraulic passage 17a of the first hydraulic system from the first hydraulic chamber 24 of the master cylinder M/C to the first hydraulic chamber (first slave hydraulic chamber) 64 of the slave cylinder S/C. The master cut-off valve MCV2 is positioned on the hydraulic passage 17b of the second hydraulic system from the second hydraulic chamber 26 of the master cylinder M/C to the second hydraulic chamber (second slave hydraulic chamber) 66 of the slave cylinder S/C.

When the electric brake system 1 normally operates, the master cut-off valves MCV1 and MCV2 are closed. Thus, an upstream hydraulic pressure produced in the master cylinder M/C is not directly transferred to the wheel cylinders 4a, 4b, 4c, and 4d by means of a brake fluid. A downstream hydraulic pressure Pdown, which is electrically produced in the slave cylinder S/C based on the upstream hydraulic pressure Pup, is transferred via hydraulic passages 18a, 18b, 19a, 19b, 19c, and 19d to the wheel cylinders 4a, 4b, 4c, and 4d at work. This operation mode is what is called a Brake-by-Wire (BBW) system. Note that such an electric brake system 1 can coordinately control a regenerative braking device which is used for an electric vehicle and/or a hybrid vehicle, etc. Specifically, a downstream hydraulic pressure Pdown is produced which corresponds to braking force as obtained by subtracting braking force of a regenerative brake from braking force corresponding to the upstream hydraulic pressure Pup. This makes it possible for a driver to comfortably brake a vehicle.

In addition, when the electric brake system 1 is under abnormal conditions, the master cut-off valves MCV1 and MCV2 are opened. Thus, an upstream hydraulic pressure produced in the master cylinder M/C is directly transferred by means of a brake fluid to the wheel cylinders 4a, 4b, 4c, and 4d to be operated. This realizes the idea of fail safe.

Also, the electric brake system 1 has P sensors (pressure sensors) Pp and Ps. The P sensor Pp is positioned at the side closer to the wheel cylinders 4c and 4d relative to the master cut-off valve MCV2 on the hydraulic passage 17b of the second hydraulic system. This P sensor Pp can detect (measure) a downstream hydraulic pressure Pdown at side closer to the wheel cylinders 4c and 4d relative to the master cut-off valve MCV2 on the hydraulic passage 17b of the second hydraulic system. The P sensor Ps is positioned at the side closer to the master cylinder M/C relative to the master cut-off valve MCV1 on the hydraulic passage 17a of the first hydraulic system. This P sensor Ps can detect (measure) an upstream hydraulic pressure Pup at the side closer to the master cylinder M/C relative to the master cut-off valve MCV1 on the hydraulic passage 17a of the first hydraulic system.

In addition, the electric brake system 1 has a stroke simulator S/S. The stroke simulator S/S is positioned at the side closer to the master cylinder M/C relative to the master cut-off valve MCV1 on the hydraulic passage 17a of the first hydraulic system. The stroke simulator S/S can take in a brake fluid which has been discharged from the first hydraulic chamber 24 of the master cylinder M/C.

When a driver presses the brake pedal 3 at an initial stage, the stroke simulator S/S decreases a pedal reaction force gradient. When the driver presses the brake pedal 3 at a later stage, the stroke simulator S/S increases the pedal reaction force gradient. In order to enhance pedal feeling of the brake pedal 3, a second return spring 44 having a low spring constant and a first return spring 43 having a high spring constant are arranged in series to urge the piston 42. The opposite side of the second return spring 44 of the piston 42 has a compartment of the hydraulic chamber 46. The hydraulic chamber 46 is connected via a shut-off valve (normally closed (N. C.)) 47 to the hydraulic passage (first hydraulic system) 17a. The shut-off valve (normally closed) 47 is connected in parallel with a check valve 48 which allows a brake fluid to pass from the hydraulic chamber 46 to the hydraulic passage (first hydraulic system) 17a but not vice versa.

When the master cut-off valve MCV 1 is closed (when the electric brake system 1 normally operates), the above configuration allows the shut-off valve 47 to open. When a driver presses the brake pedal 3, a brake fluid which has been discharged from the first hydraulic chamber 24 of the master cylinder M/C flows into the hydraulic chamber 46 to produce pedal reaction force. This, therefore, does not give uncomfortable feeling to the driver. The opposite side of the hydraulic chamber 46 of the piston 42 has a compartment of the hydraulic chamber 46a. The hydraulic chamber 46a is connected via a hydraulic passage 49 to the reservoir 16. In addition, the piston 42 is provided with a cup seal 45. Note that when the electric brake system 1 is under abnormal conditions, the master cut-off valves MCV1 and MCV2 are opened and the shut-off valve 47 is closed. When the brake pedal 3 is pressed, a brake fluid which has been discharged from the first hydraulic chamber 24 of the master cylinder M/C flows into the slave cylinder (hydraulic source) S/C but not into the stroke simulator S/S. Thus, an upstream hydraulic pressure Pup produced in the master cylinder M/C is transferred to the slave cylinder (hydraulic source) S/C as well as the wheel cylinders 4a, 4b, 4c, and 4d to actuate these devices.

In addition, the electric brake system 1 has the Vehicle Stability Assist (VSA) (a registered trade mark). The VSA is positioned between the slave cylinder S/C and the wheel cylinders 4a, 4b, 4c, and 4d, that is, between the hydraulic passage 18a of the first hydraulic system and the hydraulic passages 19a and 19b. In addition, the VSA is also positioned between the hydraulic passage 18b of the second hydraulic system and the hydraulic passages 19c and 19d.

With regard to the VSA, the first hydraulic system from the hydraulic passage 18a to the hydraulic passages 19a and 19b has the same VSA structure as the second hydraulic system from the hydraulic passage 18b to the hydraulic passages 19c and 19d. In order to make understanding easier, the same VSA member corresponding to both the first and the second hydraulic system has the same reference sign. The following describes the first hydraulic system from the hydraulic passage 18a to the hydraulic passages 19a and 19b as an example.

The VSA includes common hydraulic passages 81 and 82 for the wheel cylinders 4a and 4b (4c and 4d). The VSA also includes a regulator valve (normally open) 83 of a normally open solenoid valve which can change a degree of opening, the regulator valve being disposed between the hydraulic passage 18a (18b) and the hydraulic passage 81. The VSA includes a check valve 91 disposed in parallel to the regulator valve 83, the check valve 91 permitting a brake fluid to flow from the hydraulic passage 18a (18b) side into the hydraulic passage 81 side. The VSA includes an inner valve (normally open) 85 containing a normally open solenoid valve, the inner valve being disposed between the hydraulic passage 81 and the hydraulic passage 19a (19d). The VSA includes a check valve 93 disposed in parallel with the inner valve 85, the check valve 93 permitting a brake fluid to flow from the hydraulic passage 19a (19d) side to the hydraulic passage 81 side. The VSA includes an inner valve (normally open) 84 containing a normally open solenoid valve, the inner valve being disposed between the hydraulic passage 81 and the hydraulic passage 19b (19c). The VSA includes a check valve 92 disposed in parallel with the inner valve 84, the check valve 92 permitting a brake fluid to flow from the hydraulic passage 19b (19c) side to the hydraulic passage 81 side. The VSA includes an outer valve (normally closed) 86 containing a normally closed solenoid valve, the outer valve being disposed between the hydraulic passage 19a (19d) and the hydraulic passage 82. The VSA includes an outer valve (normally closed) 87 containing a normally closed solenoid valve, the outer valve being disposed between the hydraulic passage 19b (19c) and the hydraulic passage 82. The VSA includes a reservoir 89 connected to the hydraulic passage 82. The VSA include a check valve 94 disposed between the hydraulic passages 82 and 81, the check valve permitting a brake fluid to flow from the hydraulic passage 82 side to the hydraulic passage 81 side. The VSA includes a pump 90 disposed between the check valve 94 and the hydraulic passage 81, the pump being to supply a brake fluid from the hydraulic passage 82 side to the hydraulic passage 81 side. The VSA includes check valves 95 and 96 disposed downstream and upstream of the pump 90, the check valves permitting a brake fluid to flow from the hydraulic passage 82 side to the hydraulic passage 81 side. The VSA includes a motor M which drives the pump 90. The VSA includes a suction valve (normally closed) 88 containing a normally closed solenoid valve, the suction valve being disposed between the hydraulic passage 18a (18b) and an intermediate position between the check valves 94 and 95. The hydraulic passage 18a at the side closer to the VSA has a pressure sensor that detects a downstream hydraulic pressure Pdown produced by the slave cylinder S/C.

Note that when the electric brake system 1 is under abnormal conditions such as a case where the slave cylinder S/C cannot be actuated, the master cut-off valves (shut-off valves: normally open) MCV1 and MCV2 are opened and the shut-off valve (normally closed) are closed. The upstream hydraulic pressure Pup produced in the first hydraulic chamber 24 of the master cylinder M/C is transferred via the first hydraulic chamber 64 of the slave cylinder S/C as a downstream hydraulic pressure Pdown to actuate the wheel cylinders 4a and 4b of the first hydraulic system. The upstream hydraulic pressure Pup produced in the second hydraulic chamber 26 of the master cylinder M/C is transferred via the second hydraulic chamber 66 of the slave cylinder S/C as a downstream hydraulic pressure Pdown to actuate the wheel cylinders 4c and 4d of the second hydraulic system. At this occasion, when the hydraulic passages (the second hydraulic system) 18b, 19c, and 19d that connect the second hydraulic chamber 66 of the slave cylinder S/C to the wheel cylinders 4c and 4d of the second hydraulic system are failed, a hydraulic pressure inside the second hydraulic chamber 66 is lost. Accordingly, the second piston 63 moves forward against the first piston 62. It is therefore likely to expand a volume of the first hydraulic chamber 64, which results in a decrease in a pressure of a brake fluid fed to the wheel cylinders 4a and 4b of the first hydraulic system. However, the maximum distance and the minimum distance between the first piston 62 and the second piston 63 are restricted by restricting means 78. In addition, a sliding range of the second piston 63 is restricted by restricting means 79 (the movement of the second piston 63 is restricted). Consequently, even if a hydraulic pressure of the second hydraulic chamber 66 is lost, it is possible to prevent expansion of the volume of the first hydraulic chamber 64. This configuration secures the operation of the wheel cylinders 4a and 4b of the first hydraulic system, thereby ensuring a braking force.

As illustrated in FIG. 1, the restricting means 79 is arranged in the vicinity of the second atmosphere port 57b with regard to the axial direction of the cylinder 61. The restricting means 79 is positioned in the vicinity of the second back chamber 56. Since the restricting means 79 is arranged in such a manner, the length of the second piston 63 in the axial direction can remain short. If the length of the second piston 63 can be shortened, the length of the cylinder 61 housing the piston can be shortened. Eventually, the entire length of the slave cylinder S/C can be shortened. As the entire length of the slave cylinder S/C become short, installability of the cylinder onto the electric brake system 1 as well as a vehicle is improved. In addition, since the length of the cylinder 61 can be shortened, the cylinder 61 can have a short internal depth in the axial direction. Thus, this configuration makes it easier to produce the cylinder, thereby increasing its productivity.

The restricting means 79 includes an elongated hole 79b formed in the second piston 63 and a pin 79a which is fixed to and projects from the cylinder 61 and which engages the elongated hole 79b. According to this configuration, the second piston having the elongated hole 79b can only move within an extent to which the pin 79a projecting from the cylinder 61 engages the elongated hole 79b. The restricting means 79 thus restricts the movement of the second piston 63.

Figure 2:
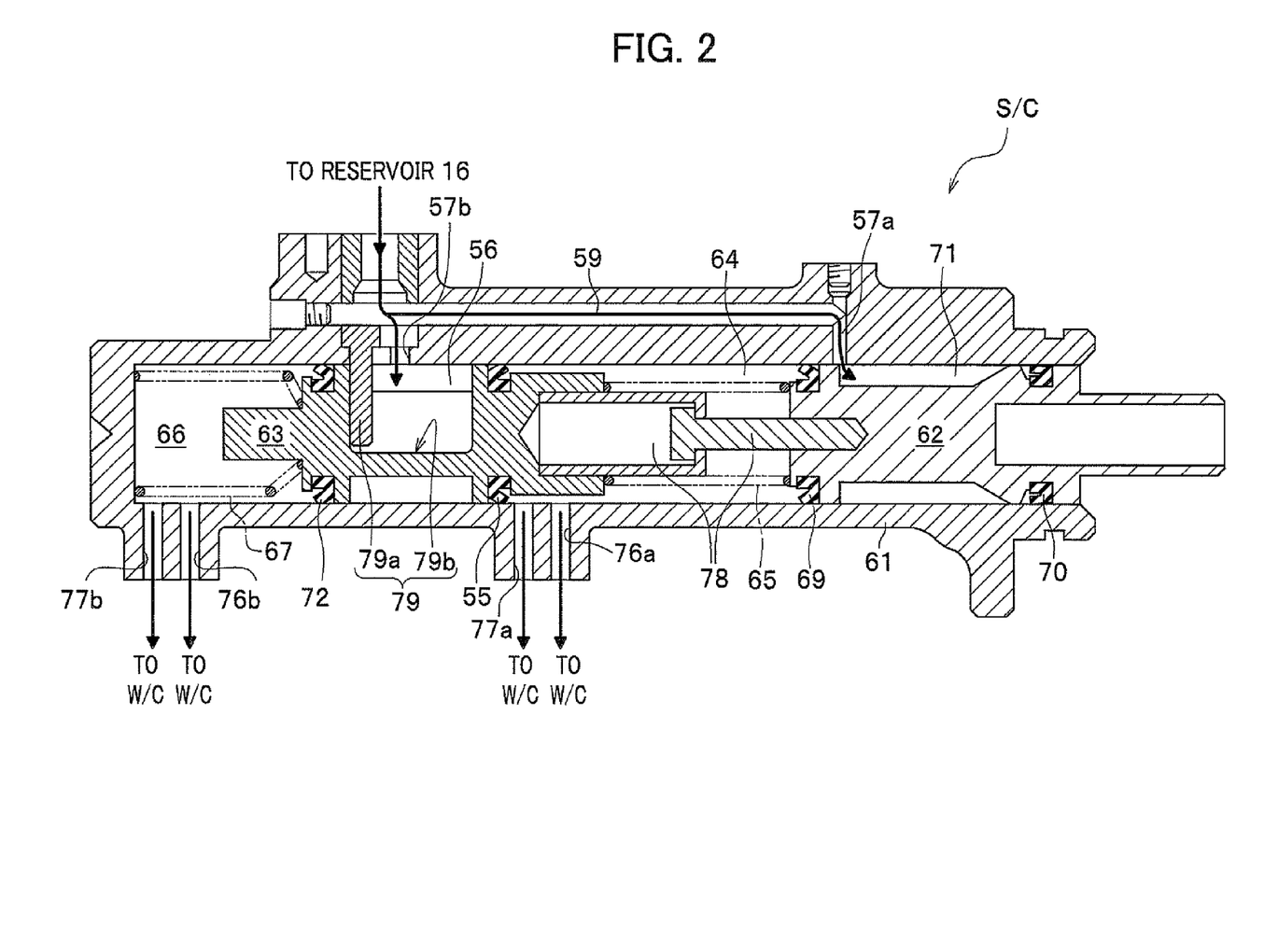
FIG. 2 is a cross-sectional view of a cylinder peripheral portion of a slave cylinder according to the embodiment of the present invention.

FIG. 2 is a cross-sectional view of a portion surrounding the cylinder 61 of the slave cylinder S/C according to the embodiment of the present invention. The pin 79a of the restricting means 79 is disposed in the vicinity of the second atmosphere port 57b and stands from the opening of the cylinder 61 at the second atmosphere port 57b toward the center axis of the second piston 63. Also, the depthwise direction of the elongated hole 79b is in accordance with the standing direction of the pin 79a. In order to allow the pin 79a to stand from the cylinder 61, a hole is formed in the cylinder 61, and the pin 79a is fitted into the hole. Since the hole for fitting the pin may be defined in the vicinity of the hole used for the second atmosphere port 57b in the same direction, the former hole is easily formed. In addition, the pin 79a is allowed to stand while examining the status, such as a position of the hole at the second piston 63, through the hole used for the second atmosphere port 57b. Consequently, this allows the pin 79a to easily stand into the cylinder 61 while the pin engages the elongated hole 79b of the second piston 63.

Description of Reference Numerals
1 electric brake system
3 brake pedal (brake operation part)
4a, 4b, 4c, 4d wheel cylinder (W/C, brake cylinder)
17a, 18a, 19a, 19b hydraulic-pressure passage (first hydraulic-pressure system)
17b, 18b, 19c, 19d hydraulic-pressure passage (second hydraulic-pressure system)
51 motor
55 cup seal
56 second back chamber
57a first atmosphere port
57b second atmosphere port
59 passage
61 cylinder
62 first piston (slave piston)
63 second piston (slave piston)
64 first slave hydraulic-pressure chamber
65 first return spring
66 second slave hydraulic-pressure chamber
67 second return spring
69 cup seal
70 cup seal
71 first back chamber
72 cup seal
76a first input port
76b second input port
77a first output port
77b second output port
78 restricting means
79 restricting means
79a pin 79b elongated hole
M/C master cylinder
MCV1, MCV2 master cut-off valve (shut-off valve: normally open)
Pp, Ps P sensor (pressure sensor, hydraulic-pressure detector)
S/C slave cylinder (hydraulic-pressure source)
S/S stroke simulator
VSA Vehicle Stability Assist

The invention claimed is:
1. A slave cylinder comprising:
a piston cylinder housing a first piston to be moved forward by a motor and; a second piston disposed in front of the first piston,
wherein the piston cylinder has a first slave hydraulic chamber formed between the first piston and the second piston,
wherein the piston cylinder defines a first input port communicating with the first slave hydraulic chamber,
wherein the first input port is connected to a master cylinder and is to be cut off from the master cylinder by a first shut-off valve,
wherein the piston cylinder has a second slave hydraulic chamber formed between the second piston and an end of the piston cylinder,
wherein the piston cylinder defines a second input port communicating with the second slave hydraulic chamber,
wherein the second input port is connected to the master cylinder and is to be cut off from the master cylinder by a second shut-off valve,
wherein the piston cylinder defines:
a first atmosphere port communicating with a first back chamber which is disposed in rear of the first slave hydraulic chamber and which moves together with the first piston; and
a second atmosphere port communicating with a second back chamber which is disposed in front of the first slave hydraulic chamber and in rear of the second slave hydraulic chamber and which moves together with the second piston,
wherein the slave cylinder further comprises a restricting structure to restrict the second piston from moving backward, wherein the restricting structure comprises a hole formed in the second piston, and a stopper fixed to the first piston, wherein the stopper is disposed in the hole of the second piston and engaged with the second piston, and wherein the second atmosphere port is disposed in the vicinity of the restricting structure in an axial direction of the piston cylinder.

2. The slave cylinder according to claim 1, wherein the restricting structure comprises a bottomed hole formed in the second piston; and a pin protruding from an opening of the cylinder in a direction toward the second piston, and wherein the pin is disposed in the bottomed hole and engaged with the second piston.

3. The slave cylinder according to claim 1, wherein the piston cylinder defines a first output port which communicates with the first slave hydraulic chamber and is connected to a first brake cylinder, and wherein the first output port is disposed in the vicinity of the first input port in the axial direction of the piston cylinder.

4. The slave cylinder according to claim 2, wherein the piston cylinder defines a first output port which communicates with the first slave hydraulic chamber and is connected to a first brake cylinder, and wherein the first output port is disposed in the vicinity of the first input port in the axial direction of the piston cylinder.

5. The slave cylinder according to claim 1, wherein the piston cylinder defines a second output port which communicates with the second slave hydraulic chamber and is connected to a second brake cylinder, and wherein the second output port is disposed in the vicinity of the second input port in the axial direction of the piston cylinder.

6. The slave cylinder according to claim 2, wherein the piston cylinder defines a second output port which communicates with the second slave hydraulic chamber and is connected to a second brake cylinder, and wherein the second output port is disposed in the vicinity of the second input port in the axial direction of the piston cylinder.

7. The slave cylinder according to claim 3, wherein the piston cylinder defines a second output port which communicates with the second slave hydraulic chamber and is connected to a second brake cylinder, and wherein the second output port is disposed in the vicinity of the second input port in the axial direction of the piston cylinder.

8. The slave cylinder according to claim 4, wherein the piston cylinder defines a second output port which communicates with the second slave hydraulic chamber and is connected to a second brake cylinder, and wherein the second output port is disposed in the vicinity of the second input port in the axial direction of the piston cylinder.

9. The slave cylinder according to claim 1, wherein the first piston is off from the first input port, and the second piston is off from the second input port.

* * * * *